United States Patent [19]
Angelopoulos et al.

[11] Patent Number: 5,155,777
[45] Date of Patent: Oct. 13, 1992

[54] SCATTERED LIGHT BLOCKING LAYER FOR OPTOELECTRONIC RECEIVERS

[75] Inventors: Marie Angelopoulos, Briarcliff Manor; Mitchell S. Cohen, Ossining, both of N.Y.; Andrew T. S. Pomerene, New Fairfield, Conn.; Dennis L. Rogers, Croton-on-Hudson, N.Y.

[73] Assignee: International Business Machines Corporation, Armonk, N.Y.

[21] Appl. No.: 721,731

[22] Filed: Jun. 26, 1991

[51] Int. Cl.$^5$ .............................. G02B 6/12
[52] U.S. Cl. ...................... 385/14; 385/49; 385/129; 357/19
[58] Field of Search ............ 385/14, 49, 129, 130, 385/131, 132, 116; 357/19, 30 G

[56] References Cited

U.S. PATENT DOCUMENTS

| | | | |
|---|---|---|---|
| 3,630,015 | 12/1971 | Lehovec | 58/50 |
| 3,728,007 | 4/1973 | Hedman, Jr. et al. | 350/160 |
| 3,904,270 | 9/1975 | Cheo | 385/49 X |
| 3,924,931 | 12/1975 | Cheo | 385/49 X |
| 3,971,724 | 7/1976 | Fasano | 252/63.2 |
| 4,085,501 | 4/1978 | Currie | 385/14 X |
| 4,204,866 | 5/1980 | Horak et al. | 385/116 X |
| 4,264,147 | 4/1981 | Bauer et al. | 350/345 |
| 4,733,927 | 3/1988 | Jackson et al. | 385/129 |
| 4,768,878 | 9/1988 | Heine et al. | 350/237 |
| 4,915,486 | 4/1990 | Hansen | 350/171 |
| 4,989,935 | 2/1991 | Stein | 385/14 |
| 5,006,906 | 4/1991 | Deri | 385/14 X |

OTHER PUBLICATIONS

Applied Optics, vol. 24, pp. 2520–2525, 1985.
Applied Optics, vol. 27, pp. 476–479 1988.
U.S. Patent application serial number 07/542,275, filed Jun. 22, 1990.
U.S. Patent application serial number 07/495,241, filed Mar. 16, 1990.
The Proceedings of the Picoseco Electronics and Optoelectronics Conference by D. L. Rogers, "Interdigitated Metal-Semiconductor-Metal Detectors", 1989.

*Primary Examiner*—John D. Lee
*Assistant Examiner*—Phan T. Heartney
*Attorney, Agent, or Firm*—Daniel P. Morris

[57] ABSTRACT

Methods, apparatus and manufacturing processes are set forth which reduce the affects of scattered light in electro-optical devices, fiber optic links, etc., through the use of radiation sensitive compounds which, for example, can be easily applied to a semiconductor wafer when fabricating a solid state integrated receiver. According to the invention, a given radiation sensitive compound is transformed into a light blocking material (i.e., a material that will not transmit light) as a result of a lithographic (and in some cases a photolithographic) process. The resultant blocking material may be easily removed from any regions which is designed to receive transmitted light (for example, detector regions); while any other light sensitive regions remain covered (i.e., are protected) by the blocking material at the conclusion of the process.

19 Claims, 2 Drawing Sheets

SCATTERED LIGHT BLOCKING LAYER FOR OPTOELECTRONIC RECEIVERS

BACKGROUND OF THE INVENTION

1. Field of the Invention

The invention relates generally to solid state integrated receivers that include a plurality of light sensitive regions, including a light detector, and to methods and apparatus for protecting the light sensitive regions (other than the detector) from being directly affected by scattered or stray light. More particularly, the invention relates to methods and apparatus for blocking scattered light through the use of a radiation sensitive polymer layer which is easily applied to a semiconductor wafer during the receiver fabrication process. The polymer layer is transformed into a light blocking material as a result of a lithographic process in which preselected portions of the layer are irradiated. Any light sensitive regions which are to be protected are covered by the blocking material (i.e., a material that will not transmit light) at the conclusion of the fabrication process.

In a broader context the invention contemplates the use of thin film as a light blocking layer which protects light sensitive regions (e.g., circuitry) located on a semiconductor substrate, where the film is comprised of a radiation sensitive polymer that is transformed into a light blocking material upon being irradiated.

According to the invention, the polymer must be easy to apply and must adhere to the semiconductor surface. It must be possible to pattern the thin film layer in a simple manner so as to permit its easy removal from any detector areas, areas associated with bonding pads, etc. Furthermore, the resulting thin film must have a high optical absorbance at a preselected wavelength (for example, 850 or 1300 nm), and must be able to withstand high temperature operations, such as the temperature ranges required to perform die bonding.

Related methods and apparatus for use in fiber optic links, Direct Optical Connectors (DOCs), fiber plate fabrication, etc., to for example, reduce crosstalk between a plurality of channels through which light energy may be transmitted, are also contemplated by the invention.

2. Description of the Related Art

Well known methods and apparatus exists for reducing the affects of stray or scattered light in a variety of applications. For example, Heine et al in U.S. Pat. No. 4,768,878, issued Sep. 6, 1988, teaches the use of a mechanical block (a diaphragm) for reducing the scattered light components in a scanning light ray used, in conjunction with an optoelectronic receiver, to detect submicrometer range defects in a surface under test.

Other mechanical techniques for reducing the affects of scattered light include the light trap taught in German Patent 26 43 361, issued Mar. 30, 1978, to Joachim et al; and a light baffle for absorbing stray light in a liquid crystal display to achieve improved optical contrast, as taught by Hedman, Jr. et al in U.S. Pat. No. 3,728,007, issued Apr. 17, 1973.

Techniques are also known for applying a background layer or coating in electro-optical display devices to improve visibility. For example, Fasano in U.S. Pat. No. 3,971,724, issued Jul. 27, 1976, describes techniques for applying a black thick film in such devices to serve as a visual background layer. In particular, the composition taught by Fasano is suitable for application as a printing medium and compatible for application by standard thick film techniques which will form a layer, that upon firing under the usual thick film temperatures and atmospheres, will yield a dielectric layer having a black, deep matte finish. The layer is easy to apply and has a substantive affinity to substrates and components commonly used to fabricate optoelectronic display devices.

Still other techniques are known which reduce scattered light in electro-optical devices. Bauer et al, in U.S. Pat. No. 4,264,147, issued Apr. 28, 1981, describes an indicating device having an electro-optical light valve unit arranged behind a plate containing fluorescent particles. The indicating device includes a contrast filter, disposed behind the plate and unit in the direction of viewing, and a reflector disposed behind the contrast filter. The contrast filter will pass light of the spectrum which excites the fluorescent particles of the fluorescent plate; but absorbs the emitted fluorescent light and majority of the other light so that a background is either dark or of a specific color.

None of the aforementioned mechanical, thick film or specific wavelength absorption methods are well suited for use in present day optoelectronic photoreceivers, high speed (gigabit range) optical links, DOCs, etc., for one or more of the following reasons: (1) exposure of the object being fabricated to high temperature operations such as die bonding; (2) the difficulty in applying, patterning and otherwise using the prior art techniques in the very small regions (for example, where circuitry is etched on a semiconductor substrate) on which many types of optoelectronic circuits are fabricated; (3) problems with the adherence characteristics of certain light blocking materials placed in contact with a semiconductor (e.g., GaAs); removal of light blocking material from light detecting regions and areas associated with bonding pads, etc. Not one of the known prior art techniques for protecting light sensitive regions from scattered light satisfactorily address all of these problems. Accordingly, it would be desirable if such techniques were available.

Photolithographic techniques, which will be seen hereinafter to be part of a solution to the aforestated problems, are known for making electro-optical components, such as semiconductor lasers, LEDs, detectors, and associated circuitry, as well as lenslet arrays, which are suitable for use in fabricating Direct Optical Connectors (DOCs), etc.. These techniques, which can, for example, help reduce interchannel crosstalk in a DOC by rendering regions between channels opaque, are described in Volume 24, pp 2520–2525 of Applied Optics (1985) and Volume 27, pp 476–479 of Applied Optics (1988).

These references teach exposing photosensitive glass to light in the area outside the region corresponding to the lenslets. However, the aforesaid techniques do not protect light sensitive regions per se (for example, light sensitive circuitry) from scattered light, nor do they involve the application of an easily applied thin layer of material for protecting preselected light sensitive regions, etc.

Patent application Ser. No. 07/542,275, filed Jun. 22, 1990, entitled "Electro-Optical Connectors" now U.S. Pat. No. 5,093,879, and assigned to the assignee of the present invention, teaches the use of an integrated detector and preamplifier which forms a receiver array, in DOCs. Such an integrated receiver can be realized utilizing GaAs MESFET technology. It will be seen hereinafter that this type of receiver (which contains a plurality of light sensitive regions including the detector), is an example of where the invention described herein finds significant utility.

The aforementioned patent application, hereby incorporated by reference, also teaches coating each fiber in an imaging fiber plate, with a thin absorbing layer (an EMA, extra-mural absorber) for the filling of the portion of the interstitial region between fibers with special light absorbing glass to help suppress optical crosstalk. Again, these techniques (like those in the referenced Applied Optics volumes) particularly address crosstalk related problems, and deal with a glass material that absorbs light; not an easily applied polymer, of the type to be described hereinafter, that realizes the benefits contemplated by the invention.

The aforementioned copending patent application also suggests that (1) waveguides used in Energy Transfer Fiber Plates (ETFPs) can be formed from polymers, in particular, photosensitive polymers such as those described patent application Ser. No. 07/495,241, now U.S. Pat. No. 5,054,572, filed Mar. 16, 1990, IBM Docket No. Y0989-086; and (2) that the interface of end plates used in Remote Optical Connectors (ROCs), can be coated with light absorbing surface layers to minimize stray light, etc. However, there is no suggestion in the incorporated reference that photosensitive polymers can be used to protect light sensitive regions per se from scattered light, nor are any techniques set forth (and indeed none are known in the prior art) for achieving such protection using thin films applied to a semiconductor, etc., while solving the problems set forth hereinbefore.

Accordingly, it would be desirable to be able to use thin films that result from the exposure of photosensitive polymers to light in a photolithographic process as a light blocking layer which protect light sensitive regions (e.g., circuitry) located on a semiconductor substrate.

More generally, it would be desirable to be able to use thin films that result from the exposure of radiation sensitive polymers (whether light sensitive, electron beam sensitive, etc.), in a lithographic process, as a light blocking layer which protect light sensitive regions located, for example, on a semiconductor substrate.

Furthermore, it would be desirable to be able to use a polymer that is easy to apply to the regions to be protected and which adheres well to a semiconductor surface.

Still further, it would be desirable to be able to easily pattern the thin film layer so as to facilitate its removal from any detector areas, areas associated with bonding pads, etc.

Further yet, it would be desirable if the resulting thin film has a high optical absorbance at preselected wavelengths, and is able to withstand high temperature operations, such as the temperature ranges required to perform die bonding.

SUMMARY OF THE INVENTION

It is an object of the invention to provide methods, apparatus, and optoelectronic component fabrication processes that use thin films, in particular those that result from the exposure of radiation sensitive polymers in a lithographic process (for example, exposing a photosensitive polymer to light, irradiating an electron sensitive polymer with an electron beam, etc.), as a light blocking layer in order to protect light sensitive regions (e.g., circuitry) located on semiconductor substrates, to inhibit crosstalk in optical connectors, etc.

It is a further object of the invention to utilize polymers that are easy to apply, and which result in films that adhere well to a semiconductor surface, such as GaAs.

Still further, it is an object of the invention to provide a thin film that is easy to pattern and remove.

Further yet, it is an object of the invention to provide a thin film coating for preselected light sensitive regions, where the film has a high optical absorbance at preselected wavelengths, and is able to withstand high temperature operations, such as the temperature ranges required to perform die bonding.

According to one embodiment of the invention, a method is set forth for protecting light sensitive regions in an integrated circuit from the affects of stray light, where the circuit includes at least one light detecting region. In particular, a novel method directed to this one embodiment of the invention comprises the steps of: (a) coating all of said light sensitive regions in said integrated circuit with a first material that is radiation sensitive and is transformed into a light blocking layer when said first material is irradiated in a lithographic process; and (b) exposing the coated light sensitive regions to radiation in a lithographic process to effect the transformation of said first material into said light blocking layer in such a manner as to assure that any light detecting region included in said integrated circuit is not covered by said light blocking layer.

According to a preferred embodiment of the invention, the first material is a polymeric material being selected from the group consisting essentially of polyimides, substituted and unsubstituted polyparaphenylenevinylenes, polyanilines, polyazines, polythiophenes, poly-p-phenylene sulfides, polyfurans, polypyrroles, polyselenophene, polyacetylenes formed from soluble precursors and combinations thereof and blends thereof with other polymers.

According to an alternate embodiment of the invention, a process for fabricating integrated receiver chips, each comprising a plurality of light sensitive regions including a light detector, is set forth wherein said plurality of light sensitive regions will be protected from the affects of stray light when operating a given receiver.

The novel process contemplated by this alternative embodiment of the invention comprises the steps of: (a) applying a coating of a radiation sensitive compound, which functions as a light absorbing material after being irradiated in a lithographic process, to a semiconductor wafer from which said receiver chips are to be formed, wherein said wafer includes said plurality of light sensitive regions associated with each receiver chip; (b) drying the applied coating; (c) covering the detector portion of each receiver chip with an opaque material; (d) exposing said wafer to radiation to transform the exposed portions of said applied coating into said light absorbing material; (e) removing the opaque material and unexposed portions of said applied coating to enable the detector portion of each receiver to detect light energy; and (f) dicing the semiconductor wafer into individual receiver chips to complete the fabrication process.

The aforementioned steps of covering the detector portion of each receiver chip with an opaque material and exposing the wafer to radiation to transform the exposed portions of said applied coating into a light absorbing material, may, in cases where photolithography is used, be performed through a mask which contains a preselected pattern (the opaque material on the mask is typically patterned chrome on quartz). In electron beam lithography applications the beam may be focused without the use of a mask (a direct write process) to irradiate preselected coated areas of the wafer.

In accordance with a preferred embodiment of the invention, where a photo process is performed using a polyaniline, the polyaniline is mixed with onium salts which decompose upon exposure to light or to an electron beam, generating acids. These acids then induce doping in the polyaniline and the material becomes conducting. The conducting form of the material absorbs light very well in the range of 850 nm and above.

After exposure, the unexposed regions are soluble and can be removed, for example, by organic solvents. By way of contrast, the exposed regions are insoluble and hence the desired light blocking layer is left in tact.

According to the alternate embodiment of the invention, the radiation sensitive compound is a polymeric material being selected from the group consisting essentially of polyimides, substituted and unsubstituted polyparaphenylenevinylenes, polyanilines, polyazines, polythiophenes, poly-p-phenylene sulfides, polyfurans, polypyrroles, polyselenophene, polyacetylenes formed from soluble precursors and combinations thereof and blends thereof with other polymers.

Yet another embodiment of the invention is directed to a solid state integrated receiver that includes a plurality of light sensitive regions, comprising: (a) a first receiver surface consisting essentially of a semiconductor; and (b) a thin film layer, adhering to said first receiver surface, having a high optical absorbance at a preselected wavelength.

In an illustrative embodiment of the novel solid state integrated receiver the first receiver surface consists essentially of GaAs, the thin film layer is patterned to leave any light detecting regions bare while covering the remainder of said plurality of light sensitive regions, and the thin film layer is created from a radiation sensitive compound that is irradiated in a lithographic process.

Once again, according to the invention, the radiation sensitive compound is a polymeric material being selected from the group consisting essentially of polyimides, substituted and unsubstituted polyparaphenylenevinylenes, polyanilines, polyazines, polythiophenes, poly-p-phenylene sulfides, polyfurans, polypyrroles, polyselenophene, polyacetylenes formed from soluble precursors and combinations thereof and blends thereof with other polymers.

Other aspects of the invention include structures for transmitting radiation that employ the aforestated techniques for blocking scattered light at a variety of locations, such as on light transmitting arrays, light receiving arrays, in channel plates interposed between such arrays, etc.

The invention features the ability to easily create and use thin films to block scattered light in a variety of optoelectronic components, such as an optoelectronic photoreceiver, a DOC, etc. Furthermore, the invention features the use of photoimageable and other radiation sensitive polymers to create the desired films, where the polymer may be easily applied, and the resulting film may be easily patterned, removed, stand up and adhere to a semiconductor surface (such as GaAs) when exposed to high temperatures, etc.

These and other objects and features of the invention, and the manner of obtaining them, will become apparent to those skilled in the art, and the invention itself will be best understood by reference to the following detailed description read in conjunction with the accompanying Drawing.

DETAILED DESCRIPTION

Using Interdigitated Metal-Semiconductor-Metal Detectors; fully integrated, low-noise, GaAs receivers (such as those described by D. L. Rogers in "Interdigitated Metal-Semiconductor-Metal Detectors", appearing in the proceedings of the Picosec Electronics and Optoelectronics Conference in 1989) have been demonstrated which operate at high speeds (in the GHz range).

These receivers incorporate the detector, preamplifier, and a postamplifier, and are useful for a variety of applications, specifically including receiving Gbit/sec signals in a fiber-optic link, or receiving signals in a direct optical connector (DOC), such as the DOC described in the incorporated patent application.

In applications where such a receiver, or indeed where other kinds of detector-receivers, are used, scattered light can represent a serious problem. For example, in the fiber-optic link application stray light from ambient sources could enter the package, and perhaps after several reflections hit the detector surface and hence give a spurious signal.

In the DOC application, where a multiplicity of closely spaced channels is needed (again, as discussed in the incorporated patent application), light from one transmitter-receiver pair could, after several multiple reflections, enter the receiver associated with a neighboring transmitter-receiver pair, thereby causing crosstalk.

There is, therefore, a need for a light-absorbing layer which can be easily applied to the entire surface of one of the aforesaid receivers (used herein to illustrate the principles of the invention) in such a manner that all light which strikes this surface is substantially absorbed, except for light which directly hits the detector area, which must of course be transmitted.

This light-blocking layer must have several characteristics:

1. A thin layer of this material must have high optical absorbance at the wavelength of interest, e.g., 850 or 1300 nm.
2. This layer must adhere well to the receiver surface, i.e., GaAs.
3. The layer must be able to withstand subsequent high temperature operations, for example die bonding operations.
4. It must be possible to pattern the layer in a simple manner so as to permit its easy removal in the detector areas and in the areas associated with bonding pads (so that wire bonds may be easily made).
5. Where a mask is used the polymer should be transparent in visible light to facilitate mask alignment, while being opaque or capable of being rendered opaque in the wavelength region of device operation in the areas where light blocking in those wavelengths is required.

One such material is photosensitive polyaniline. This material meets all of the above criteria.

Figure 1:
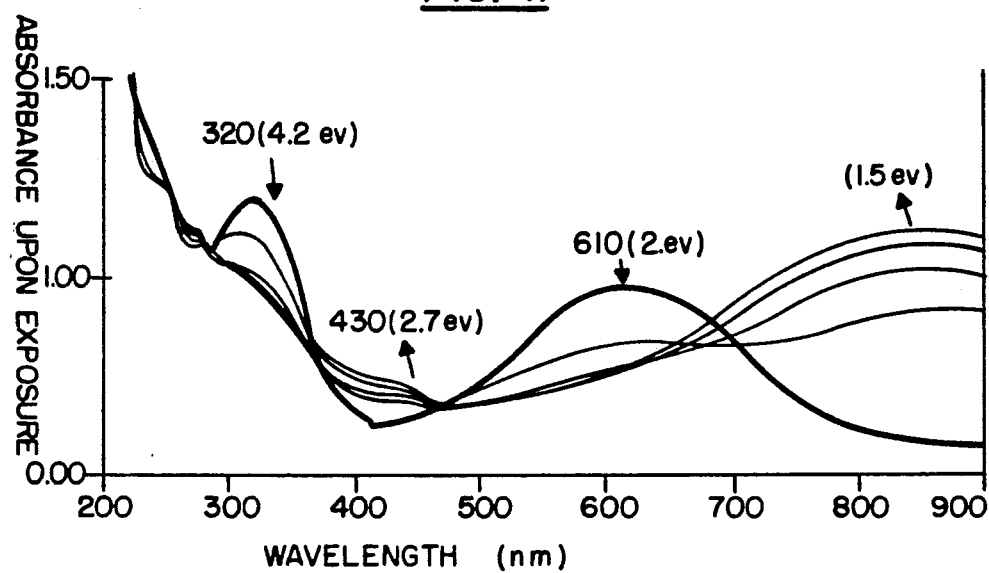
FIG. 1 depicts the changes observed in the optical spectrum of polyaniline upon exposure to radiation.

First, it can be patterned using onium salt chemistry upon exposure to electron-beam or ultra-violet radiation. Furthermore, FIG. 1 depicts the changes observed in the optical spectrum of polyaniline upon exposure to radiation. As can be seen with reference to FIG. 1, a strong polaronic absorption peak appears at the desired wavelength (850 nm) so that the required light blocking is achieved. The unexposed regions can subsequently be removed by a solvent wash.

Second, the polyaniline was found to adhere well to GaAs. A film between 1000 and 2000 Angstroms of the polyaniline was spun on a GaAs surface will yield a film with satisfactory adherence characteristics.

The parent polyaniline material, the absorption characteristics of which are depicted in FIG. 1, may be used to create the thin film contemplated by the invention, or other photoimageable or radiation sensitive polymers, such as a substituted polyaniline, a substituted or unsubstituted polythiophene, substituted or unsubstituted polypyrroles, substituted or unsubstituted polyfurans or a photosensitive polyimide, etc., may be used.

According to an alternate embodiment of the invention, a process for fabricating integrated receiver chips, each comprising a plurality of light sensitive regions including a light detector, where it is desirable to protect the plurality of light sensitive regions from the affects of stray light when operating a given receiver, comprises the steps of: (a) applying a coating of a radiation sensitive compound, which functions as a light absorbing material after being irradiated in a lithographic process, to a semiconductor wafer from which said receiver chips are to be formed, wherein said wafer includes said plurality of light sensitive regions associated with each receiver chip; (b) drying the applied coating; (c) covering the detector portion of each receiver chip with an opaque material; (d) exposing said wafer to radiation to transform the exposed portions of said applied coating into said light absorbing material; (e) removing the opaque material and unexposed portions of said applied coating to enable the detector portion of each receiver to detect light energy; and (f) dicing the semiconductor wafer into individual receiver chips to complete the fabrication process.

The above described process is a departure from its application in well known photolithographic and chip fabrication processes in that it calls for the use of the radiation sensitive compounds (such as a photosensitive polyaniline polymer) to achieve the light blocking layer having the desirable characteristics set forth hereinbefore.

Figure 2A:
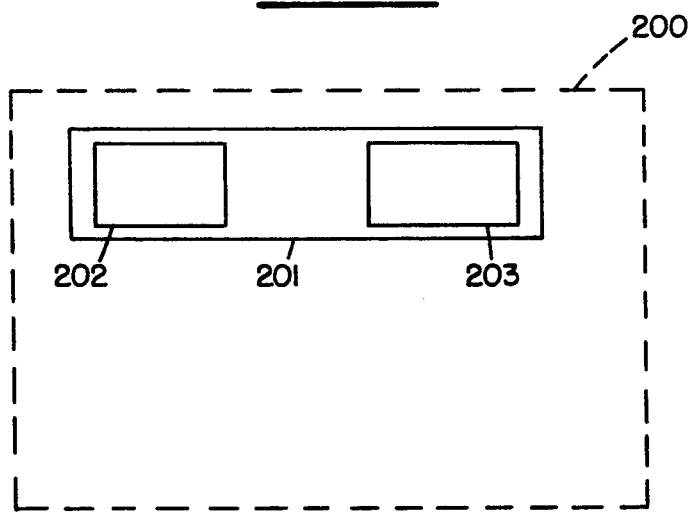
FIGS. 2A-2C depict a portion of a semiconductor wafer that includes a plurality of light sensitive regions, including a light detector, before, during and after the process of applying the light blocking layer contemplated by an embodiment of the invention.
Figure 2B:
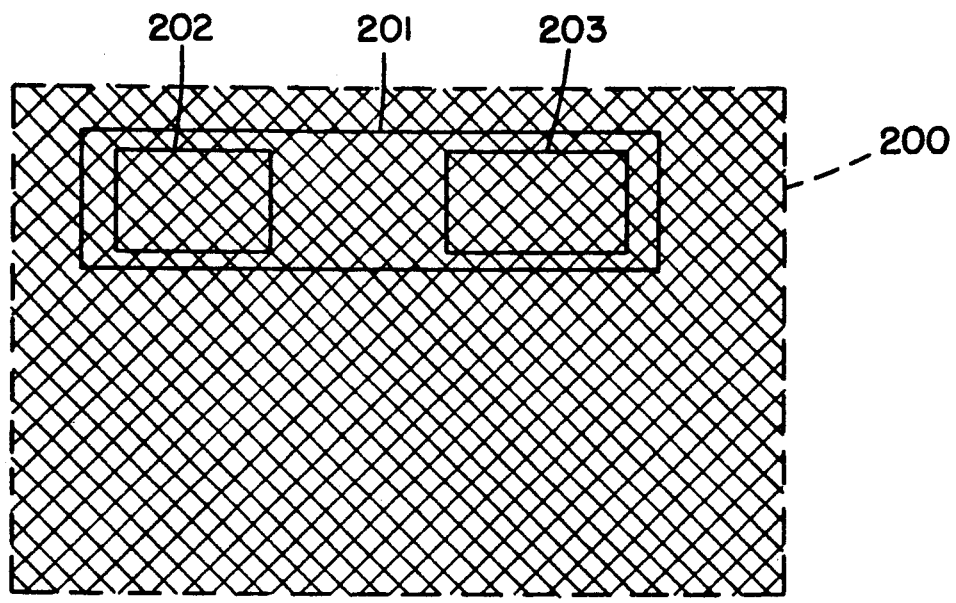
Figure 2C:
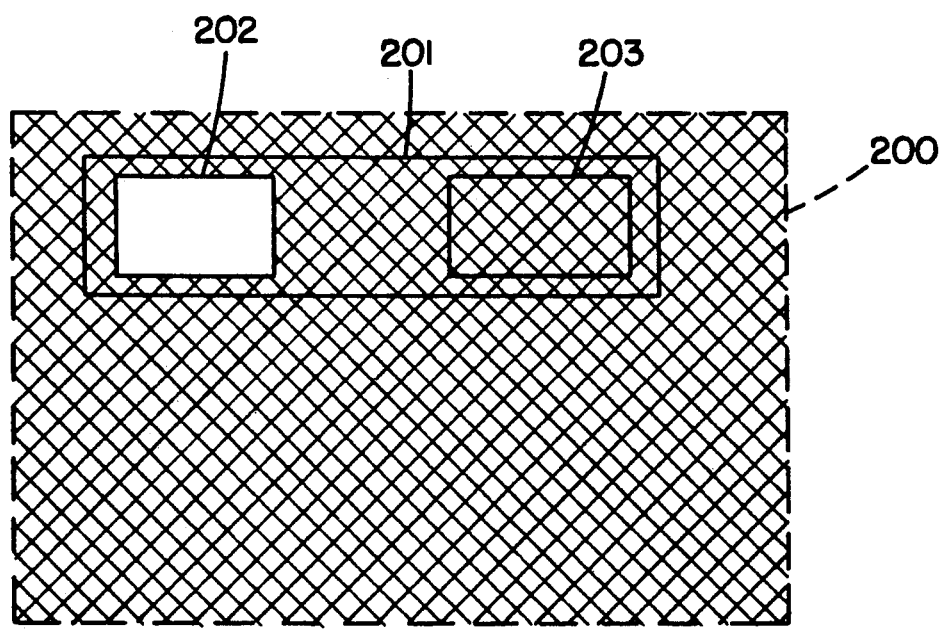

Reference should now be made to FIGS. 2A-2C which depict a portion of a semiconductor wafer that includes a plurality of light sensitive regions, including a light detector, before, during and after the aforestated process of applying the light blocking layer contemplated by the invention.

In FIG. 2A, 201 depicts a portion of one integrated receiver being fabricated on wafer 200, where receiver 201 includes a light detecting region 202 and light sensitive region (not a detector) 203.

In FIG. 2B, the cross hatched area represents the photoimagable compound coating applied to receiver 201 (and indeed to all of wafer 200 in accordance with the embodiment of the invention encompassing the process outlined hereinabove), at step a of the aforestated process.

After the drying step (step b), standard masking techniques may be used to realize step c (the covering step performed prior to exposing the compound to light).

FIG. 2C depicts the receiver 201 portion of wafer 200 after the removal of the unexposed compound covering light detecting region 202. The resulting integrated receiver contains the thin film layer contemplated by the invention, protecting region 203.

Other embodiments of the invention are apparatus oriented. A specific example is the aforementioned integrated receiver formed via the aforestated fabrication process (or indeed by any other process yielding the same result). In other words these other embodiments of the invention are directed to a solid state integrated receiver that includes a plurality of light sensitive regions, comprising: (a) a first receiver surface consisting essentially of a semiconductor; and (b) a thin film layer, adhering to said first receiver surface, having a high optical absorbance at a preselected wavelength.

As indicated hereinbefore, in an illustrative embodiment of the novel solid state integrated receiver the first receiver surface consists essentially of GaAs, the thin film layer is patterned to leave any light detecting regions exposed while covering the remainder of said plurality of light sensitive regions, and the thin film layer is created from a radiation sensitive polymer exposed to radiation in a lithographic process. The radiation sensitive polymer may be selected from the group consisting essentially of polyimides, substituted and unsubstituted polyparaphenylenevinylenes, polyanilines, polyazines, polythiophenes, poly-p-phenylene sulfides, polyfurans, polypyrroles, polyselenophene, polyacetylenes formed from soluble precursors and combinations thereof and blends thereof with other polymers.

Additionally, as indicated hereinbefore, other aspects of the invention include structures for transmitting radiation that employ the aforestated techniques for blocking scattered light at a variety of locations, such as on light transmitting arrays, light receiving arrays, in channel plates interposed between such arrays, etc.

For example, the channel plates described in the incorporated patent application, the regions between the array of transmitting and receiving elements also described in the incorporated patent application, could all take advantage of the teachings set forth hereinbefore to limit optical crosstalk and minimize the affects of scattered (or stray) light on both an intrachannel and interchannel basis.

What has been described are methods, apparatus and manufacturing processes that meet all of the objectives set forth hereinbefore. Those skilled in the art will recognize that the foregoing description has been presented for the purposes of illustration and description only. It is not intended to be exhaustive or to limit the invention to the precise form disclosed, and obviously many modifications and variations are possible in light of the above teaching.

The embodiments and examples set forth herein were presented in order to best explain the principles of the instant invention and its practical application to thereby enable others skilled in the art to best utilize the instant invention in various embodiments and with various modifications as are suited to the particular use contemplated.

What is claimed is:

1. A solid state integrated receiver that includes a plurality of light sensitive regions, comprising:
   a first receiver surface consisting essentially of a semiconductor;
   said receiver surface containing said plurality of light sensitive regions;
   each of said plurality of light sensitive regions being optically insulated from each other at said first receiver surface; and
   a thin film layer, adhering to those parts of said first receiver surface which are between each of said plurality of light sensitive regions having a high optical absorbance at a preselected wavelength.

2. Apparatus as set forth in claim 1 wherein said semiconductor is GaAs.

3. Apparatus as set forth in claim 2 wherein said thin film layer is patterned to leave any light detecting regions exposed while covering the remainder of said plurality of light sensitive regions.

4. Apparatus as set forth in claim 2 wherein said thin film layer is created from a radiation sensitive polymer exposed to radiation in a lithographic process.

5. Apparatus as set forth in claim 2 wherein said thin film layer is created from a photoimageable polymer exposed to light in a photolithographic process.

6. Apparatus as set forth in claim 5 wherein said photoimageable polymer is a photosensitive polyaniline.

7. A solid state integrated receiver that includes a plurality of light sensitive regions, comprising:
   a first receiver surface consisting essentially of a semiconductor;
   a thin film layer of a polymer material, adhering to said first receiver surface, having a high optical absorbance at a preselected wavelength; and
   said polymer material is selected from the group of materials consisting essentially of polyimides, substituted and unsubstituted polyparaphenylenevinylenes, polyanilines, polyazines, polythiophenes, poly-p-phenylene sulfides, polyfurans, polypyrroles, polyselenophene, polyacetylenes formed from soluble precursors and combinations thereof and blends thereof with other polymers.

8. A structure for transmitting radiation comprising:
   (a) a first array of radiation emitting regions;
   (b) a second array of radiation sensing regions;
   (c) a means disposed between said first and said second arrays for channeling radiation emitted from said first array to said second array; and
   (d) light blocking means, located between said radiation sensing regions of said second array, for absorbing scattered radiation.

9. Apparatus as set forth on claim 8 wherein said light blocking means is a thin film layer patterned to leave any light sensing regions exposed.

10. Apparatus as set forth in claim 8 wherein said thin film layer is created from a radiation sensitive polymer that is irradiated during a lithographic process.

11. Apparatus as set forth in claim 8 wherein said thin film layer is created from a photoimageable polymer exposed to light in a photolithographic process.

12. Apparatus as set forth in claim 11 wherein said photoimageable polymer is a photosensitive polyaniline.

13. Apparatus as set forth in claim 8 wherein said means disposed between said first and second arrays includes a plurality of channels that are each coated with an interchannel light blocking layer of material that inhibits crosstalk and further wherein said interchannel light blocking layer is a thin film created from a radiation sensitive polymer irradiated during a lithographic process.

14. A structure for transmitting radiation comprising:
   a first array of radiation emitting regions;
   a second array of radiation sensing regions;
   a means disposed between said first and said second arrays for channeling radiation emitted from said first array to said second array;
   light blocking means, located between said radiation sensing regions of said second array, for absorbing scattered radiation; and
   wherein said light blocking means is selected from the set of materials including substituted and unsubstituted polyparaphenylenevinylenes, polyanilines, polyazines, polythiophenes, poly-p-phenylene sulfides, polyfurans, polypyrroles, polyselenophene, polyacetylenes formed from soluble precursors and combinations thereof and blends thereof with other polymers.

15. A structure for transmitting radiation comprising:
   (a) a first array of radiation emitting regions;
   (b) a second array of radiation sensing regions;
   (c) a means disposed between said first and said second arrays for channelling radiation emitted from said first array to said second array; and
   (d) light blocking means, located between said radiation emitting regions of said first array, for absorbing scattered radiation.

16. Apparatus as set forth on claim 15 wherein said light blocking means is a thin film layer patterned to leave any light emitting regions exposed.

17. Apparatus as set forth in claim 16 wherein said thin film layer is created from a radiation sensitive polymer irradiated during a lithographic process.

18. Apparatus as set forth in claim 17 wherein said radiation sensitive polymer is a photosensitive polyaniline.

19. A structure for transmitting radiation comprising:
   a first array of radiation emitting regions;
   a second array of radiation sensing regions;
   a means disposed between said first and said second arrays for channeling radiation emitted from said first array to said second array;
   light blocking means, located between said radiation emitting regions of said first array, for absorbing scattered radiation; and
   said light blocking means is selected from the set of materials including substituted and unsubstituted polyparaphenylenevinylenes, polyanilines, polyazines, polythiophenes, poly-p-phenylene sulfides, polyfurans, polypyrroles, polyselenophene, polyacetylenes formed form soluble precursors and combinations thereof and blends thereof with other polymers.

* * * * *